US012293463B2

(12) United States Patent
Mammou et al.

(10) Patent No.: US 12,293,463 B2
(45) Date of Patent: May 6, 2025

(54) APPROXIMATE HIERARCHICAL CONVEX DECOMPOSITION

(71) Applicant: Apple Inc., Cupertino, CA (US)

(72) Inventors: Khaled Mammou, Danville, CA (US); Adrian A Biagioli, Sunnyvale, CA (US); Deepak S Tolani, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 17/661,193

(22) Filed: Apr. 28, 2022

(65) Prior Publication Data
US 2023/0351697 A1 Nov. 2, 2023

(51) Int. Cl.
*G06T 17/20* (2006.01)
*G06T 7/64* (2017.01)
*G06T 19/00* (2011.01)

(52) U.S. Cl.
CPC .............. *G06T 17/205* (2013.01); *G06T 7/64* (2017.01); *G06T 19/00* (2013.01); *G06T 2207/20021* (2013.01); *G06T 2210/21* (2013.01); *G06T 2219/008* (2013.01)

(58) Field of Classification Search
CPC ................................ G06T 11/60; G06N 3/045
See application file for complete search history.

(56) References Cited

U.S. PATENT DOCUMENTS

| 6,046,744 A | 4/2000 | Hoppe |
| 6,047,088 A | 4/2000 | Van Beek et al. |
| 6,573,890 B1 | 6/2003 | Lengyel |
| 6,801,215 B1 * | 10/2004 | Silva ............... G06T 15/40 345/641 |

(Continued)

FOREIGN PATENT DOCUMENTS

EP 3882859 A1 9/2021

OTHER PUBLICATIONS

Khaled Mamou; "Volumetric Hierarchical Approximate Convex Decomposition"; [retrieved Feb. 1, 2022 from https://code.google.com/p/v-hacd/]; (2016) 19 pgs.

(Continued)

*Primary Examiner* — Abderrahim Merouan
(74) *Attorney, Agent, or Firm* — FLETCHER YODER PC

(57) ABSTRACT

A method of decomposing a three-dimensional representation of an object into a plurality of convex hulls can include instantiating a cluster priority queue in a computing system memory that initially contains a cluster corresponding to the three-dimensional representation of the object, computing with a processor of the computing system a concavity measure for each cluster in the cluster priority queue, and, for the cluster with the highest concavity measure: (1) computing with the processor a cut plane that divides the cluster corresponding to the three-dimensional representation of the object into two new clusters, each of the two new clusters having a corresponding convex hull, wherein computing a cut plane includes performing a hierarchical search of potential cut planes, (2) removing the cluster corresponding to the three-dimensional representation of the object from the cluster priority queue, and (3) adding the two new clusters to the cluster priority queue.

25 Claims, 5 Drawing Sheets

(56) References Cited

U.S. PATENT DOCUMENTS

| | | | |
|---|---|---|---|
| 8,665,267 B2* | 3/2014 | Joshi | G06T 17/20 |
| | | | 345/420 |
| 8,831,366 B1 | 9/2014 | Hickman et al. | |
| 9,442,905 B1* | 9/2016 | Kawaguchi | G06F 16/951 |
| 10,861,233 B1 | 12/2020 | De Goes et al. | |
| 11,100,721 B1 | 8/2021 | Bois et al. | |
| 2004/0090438 A1 | 5/2004 | Alliez et al. | |
| 2007/0053435 A1 | 3/2007 | Kirenko | |
| 2007/0081593 A1 | 4/2007 | Jeong et al. | |
| 2008/0031325 A1 | 2/2008 | Qi | |
| 2008/0036760 A1 | 2/2008 | Smith et al. | |
| 2008/0181522 A1 | 7/2008 | Hosaka et al. | |
| 2009/0168880 A1 | 7/2009 | Jeon et al. | |
| 2010/0036647 A1* | 2/2010 | Reem | G06T 17/20 |
| | | | 703/2 |
| 2017/0140631 A1* | 5/2017 | Pietrocola | G01J 1/4204 |
| 2017/0208417 A1* | 7/2017 | Thakur | H04S 7/306 |
| 2017/0287112 A1 | 10/2017 | Stafford et al. | |
| 2020/0050965 A1 | 2/2020 | Harvill et al. | |
| 2020/0265552 A1 | 8/2020 | Hemmer et al. | |
| 2020/0265611 A1 | 8/2020 | Hemmer et al. | |
| 2020/0286261 A1 | 9/2020 | Faramarzi et al. | |
| 2020/0327719 A1* | 10/2020 | Mason | G06T 17/10 |
| 2021/0014522 A1 | 1/2021 | Jung et al. | |
| 2022/0108482 A1 | 4/2022 | Graziosi | |
| 2022/0164994 A1 | 5/2022 | Joshi et al. | |
| 2023/0169732 A1 | 6/2023 | Wickramasinghe et al. | |
| 2023/0171427 A1 | 6/2023 | Bachhuber et al. | |
| 2023/0297737 A1* | 9/2023 | Beriot | G06F 30/17 |
| | | | 703/1 |

OTHER PUBLICATIONS

Barrill et al.; "Fast Winding Nos. for Soups and Clouds"; ACM Transaction on Graphics, vol. 37, No. 4, Article 43, Aug. 2018; 12 pgs.

"Reinforcement learning", Wikipedia, published Feb. 2, 2022.

Crassin et al.: "Octree-Based Sparse Voxelization Using the GPU Hardware Rasterizer"; OpenGL Insights; CRC Press; Chapter 22, (Jul. 23, 2012), pp. 303-219.

International Search Report & Written Opinion for PCT Application No. PCT/US2023/016956 dated Jul. 28, 2023; 10 pgs.

Jyh-Ming Lien et al.: "Approximate convex decomposition of Polyhedra"; Solid and Physical Modeling, Jun. 4, 2007 (XP058273626); pp. 121-131.

Don Fussell; "Subdivision Curves", University of Texas at Austin, CS384G Computer Graphics Course—Lecture 17—Fall 2010; 20 pgs. [retrieved from https://www.cs.utexas.edu/users/fussell/courses/cs384g-fall2011/lectures/lecture17-Subdivision_curves.pdf].

Sweldens et al.: "Morning Section: Introductory Material—Building Your Own Wavelets at Home"; Chapter 1 [retrieved from http://www.mat.unimi.it/users/naldi/lifting.pdf].

Garland et al.; "Surface Simplification Using Quadric Error Metrics"; 8 pgs. [retrived from https://www.cs.cmu.edu/~garland/Papers/quadrics.pdf].

Wikipedia—Subdivision surface ; 5 pgs. [retrieved from https://en.wikipedia.org/wiki/Subdivision_surface].

Rahul Sheth; "Open 3D Graphics Compression" ; 2 pgs.[retrieved from https://github.com/amd/rest3d/tree/master/server/o3dgc].

Draco 3D Data Compression; 3 pgs. [retrieved from https://google.github.io/draco/].

Peng et al.; "Technologies for 3D mesh compression: A survey"; J. Vis. Commun. Image R. 16 (2005) pp. 688-733 [retrieved on http://mcl.usc.edu/wp-content/uploads/2014/01/200503-Technologies-for-3D-triangular-mesh-compression-a-survey.pdf].

Maglo et al.; "3D mesh compression: survey, comparisons and emerging trends"; ACM Computing Surveys, vol. 9, No. 4, Article 39, Publication date: Sep. 2013; 40 pgs. [retrieved from https://perso.liris.cnrs.fr/glavoue/travaux/revue/CSUR2015.pdf].

Wikipedia—Z-order curve; 8 pgs. [retrieved from https://en.wikipedia.org/wiki/Z-order_curve].

"Smoothing"; 55 pgs. [retrieved from https://graphics.stanford.edu/courses/cs468-12-spring/LectureSlides/06_smoothing.pdf].

Liu et al.; "Seamless: Seam erasure and seam-aware decoupling of shape from mesh resolution"; CraGL Computational Reality Creativity and Graphics Lab; 4 pgs. [retrieved from https://cragl.cs.gmu.edu/seamless/].

Sebastian Sylvan, "Fixing Texture Seam With linear Least-Squares"; [retrieved from https://www.sebastiansylvan.com/post/LeastSquaresTextureSeams/].

Michael Bunnell; "Chapter 7. Adaptive Tessellation of Subdivision Surfaces with Displacement Mapping"; Nvidia—GPU Gems 2; 16 pgs. [retrieved from https://developer.nvidia.com/gpugems/gpugems2/part-i-geometric-complexity/chapter-7-adaptive-tessellation-subdivision-surfaces].

Schafer et al.; Dynamic Feature-Adaptive Subdivision; 8 pgs. [retrieved from https://niessnerlab.org/papers/2015/0dynamic/schaefer2015dynamic.pdf].

Pakdel, et al.; "Incremental adaptive loop subdivision" ; Computational Science and Its Applications—ICCS, vol. 3045; May 2004; pp. 237-246 [ retrieved from https://giv.cpsc.ucalgary.ca/publication/c5/].

Jiang et al.; "Rate-distortion Optimized Trellis-Coded Quantization"; IEEE ICME 2007; 4 plgs. [retrieved from https://projet.liris.cnrs.fr/imagine/pub/proceedings/ICME-2007/pdfs/0000468.pdf].

G.J.Sullivan: "Adaptive Quantization Encoding Technique Using an Equal Expected-value Rule", Joint Video Team, JVT-N011, Hong Kong (Jan. 2005); https://www.google.com/url?sa=t&rct=j&q=&esrc=s&source=web&cd=&ved=2ahUKEwitIP7t46P2AhXBJkQIHRQhDp8QFnoECAcQAQ&url=https%3A%2F%2Fwww.itu.int%2Fwftp3%2Fav-arch%2Fjvt-site%2F2005_01_HongKong%2FJVT-N011.doc&usg=AOvVaw0BvZVSEpKnTznCpBKWlvBn.

Jerry O. Talton III; "A Short Survey of Mesh Simplification Algorithms"; Course Notes for CS 598 MJG, Oct. 2004, Univity of Illinois at Urbana-Champaign; 8 pgs. [retrieved from http://jerrytalton.net/research/t-ssmsa-04/paper.pdf].

https://graphics.stanford.edu/courses/cs468-10-fall/LectureSlides/08_Simplification.pdf.

Floater et al.: "Surface Parameterization: a Tutorial and Survey"; 30 pgs. [retrieved from https://graphics.stanford.edu/courses/cs468-05-fall/Papers/param-survey.pdf].

Snyder et al.; "Iso-charts: sstretch-driven mesh parameterization using spectral analysis"; Computer Science, Eurographics Symposium on Geometric Processing, Jul. 8, 2004 [retrieved from https://www.semanticscholar.org/paper/Iso-charts%3A-stretch-driven-mesh-parameterization-Zhou-Snyder/27b260713ad9802923aec06963cd5f2a41c4e20a].

Levy et al.; "Least Squares Conformal Maps for Automatic Texture Atlas Generation"; ISA, France; 10 pgs. [retrieved from https://members.loria.fr/Bruno.Levy/papers/LSCM_SIGGRAPH_2002.pdf].

Open Subdiv Introductions; Pixar; [retrieved from https://graphics.pixar.com/opensubdiv/docs/intro.html].

How to compute mesh normals; New York University courses Fall 2002 [retrieved from https://cs.nyu.edu/~perlin/courses/fall2002/meshnormals.html].

Changkun Ou; "Geometry Processing—3 Smoothing"; Ludwig-Maximilians-Universitat—Munich; 63 pgs. [retrieved from https://www.medien.ifi.lmu.de/lehre/ws2122/gp/slides/gp-ws2122-3-smooth.pdf].

Li et al.; "Global Correspondence Optimization for Non-Rigid Registration of Depth Scans"; Applied Geometry Group, ETCH Zurich; The Eurographics Association and Blackwell Publishing Ltd .; 2008 [ retrieved from https://lgg.epfl.ch/publications/2008/sgp2008GCO.pdf].

Yao et al.; "Quasi-Newton Solver for Robust Non-Rigid Registration" Computer Science-Computer Vision and Pattern Recognition, Apr. 9, 2020 [retrieved on https://arxiv.org/abs/2004.04322].

(56) References Cited

OTHER PUBLICATIONS

Sumner et al.; "Embedded Deformation for Shape Manipulation"; Applied Geometry Group, ETH Zurich, 7 pgs. [retrieved from https://people.inf.ethz.ch/~sumnerb/research/embdef/Sumner2007EDF.pdf].
Rambo; "The Conjugate Gradient Method for Solving Linear Systems of Equations"; Department of Mathematics, Saint Mary's College of California, May 2016 [retrieved from http://math.stmarys-ca.edu/wp-content/uploads/2017/07/Mike-Rambo.pdf].
Khalid Sayood; "Adaptive Quantization—Differential Encoding"; [retrieved from https://www.sciencedirect.com/topics/computer-science/adaptive-quantization].
Wikipedia—"Context-adaptive binary arithmetic coding"; [retrieved from https://en.wikipedia.org/wiki/Context-adaptive_binary_arithmetic_coding].
Wikipedia—"Huffman coding"; 2 pgs. [retrieved from https://en.wikipedia.org/wiki/Huffman_coding].
Wikipedia—"Asymmetric numeral systems"; 1 pg. [retrieved from https://en.wikipedia.org/wiki/Asymmetric_numeral_systems].
Wikipedia—"Universal code (data compression"; 1 pg. [retrieved from https://en.wikipedia.org/wiki/Universal_code(data_compression)].
https://www.researchgate.net/publication/224359352_Two_Optimizations_of_the_MPEG-4_FAMC_standard_for_Enhanced_Compression_of_Animated_3D_Meshes/link/0912f50b3802603f34000000/download.
Pakdel et al.; "Incremental Adaptive Loop Subdivision"; 11 pgs. [retrived from https://www.researchgate.net/publication/221434740_Incremental_Adaptive_Loop_Subdivision].
Amresh et al.; "Adaptive Subdivisional Schemes for Triangular Meshes"; 10 pgs. [retrieved from https://www.researchgate.net/publication/2554610_Adaptive_Subdivision_Schemes_for_Triangular_Meshes/link/546e58c30cf2b5fc176074c3/download].
Settgast et al.; "Adaptive Tesselation of Subdivision Surfaces in Open SG"; 9 pgs. [retrieved from http://diglib.eg.org/bitstream/handle/10.2312/osg20031418/05settgast.pdf].
Brainerd et al.; "Efficient GPU Rendering of Subdivision Surfaces using Adaptive Quadtrees"; 12 pgs. [retrieved from http://www.graphics.stanford.edu/~niessner/brainerd2016efficient.html].
Fisher et al.; "DiagSplit: Parallel, Crack-free, Adaptive Tessellation for Micropolygon Rendering"; 10 pgs. [retrieved from https://www.cs.cmu.edu/afs/cs/academic/class/15869-f11/www/readings/fisher09_diagsplit.pdf].
Lai et al.; "Near-Optimum Adaptive Tessellation of General Catmull-Clark Subdivision Surfaces"; 9 pgs. [retrieved from https://www.researchgate.net/publication/220954613_Near-Optimum_Adaptive_Tessellation_of_General_Catmull-Clark_Subdivision_Surfaces/link/00b7d53ae32d0c726a000000/download].
Wu et al.; "An Accurate Error Measure for Adaptive Subdivision Surfaces"; 6 pgs. [retrieved from https://www.cise.ufl.edu/research/SurfLab/papers/05adapsub.pdf].
Patney et al.; "Parallel View-Dependent Tessellation of Catmull-clark Subdivision Surfaces"; 10 pgs. [retrieved from https://anjulpatney.com/docs/papers/2009_Patney_PVT.pdf].
Schwarz et al.; "Fast GPU-based Adaptive Tessellation with CUDA"; 10 pgs. [retrieved from http://research.michael-schwarz.com/publ/files/cudatess-eg09.pdf].
L. Ibarria et J. Rossignac. Dynapack : space-time compression of the 3D animations of triangle meshes with fixed connectivity. In Eurographics Symposium on Computer Animation, pp. 126-133, San Diego, E'tats-Unis, 2003. https://faculty.cc.gatech.edu/~jarek/papers/Dynapack.pdf.
N. Stefanoski et J. Ostermann. Connectivity-guided predictive compression of dynamic 3D meshes. In IEEE International Conference on Image Processing, pp. 2973-2976, Atlanta, E'tats-Unis, 2006.
J.-H. Yang, C.-S. Kim, et S.-U. Lee. Compression of 3-D triangle mesh sequences based on vertex-wise motion vector prediction. IEEE Transactions on Circuits and Systems for Video Technology, 12(12) : 1178-1184, 2002.

N. Stefanoski, P. Klie, X. Liu, et J. Ostermann. Scalable linear predictive coding of time-consistent 3D mesh sequences. In The True Vision—Capture, Transmission and Display of 3D Video, pp. 1-4, Kos Island, Greece, 2007.
N. Stefanoski, X. Liu, P. Klie, et J. Ostermann. Layered predictive coding of time- consistent dynamic 3D meshes using a non-linear predictor. In IEEE International Conference on Image Processing, pp. 109-112, San Antonio, E'tats-Unis, 2007.
V. Libor et S. Vaclav. Coddyac : Connectivity driven dynamic mesh compression. In 3DTV International Conference : True Vision-Capture, Transmission and Display of 3D Video, Kos Island, Greece, 2007.
Lee et al.; "Displaced subdivision surfaces", Proceedings of the ACM SIGOPS 28th Symposium on Operating Systems Principles, ACMPUS27, Jul. 1, 2000, pp. 85-94 (XP059025634).
Graziosi et al.; "[V-PCC] ]EE2.6-related] Mesh Patch Data", 132; MPEG Meeting; Oct. 12-16, 2020; Online (Motion Picutre Expert Group or ISO/IEC JTC1/SC29/WG11); Oct. 7, 2020, XP030292889 [retrieved from internet—https://dms.mpeg.expert/doc_end_user/documents/132_OnLine/wg11/m55368-v1-m55368_mesh_patch_data.zip—retrieved on Oct. 7, 2020]; 14 pgs.
Ma et al.; "Meshes Simplification Based on Reverse Subdivision", Nov. 29, 2006, SAT 2015 18th International Conference, Austin, TX, Sep. 24-27, 2015; XP047402200; 12 pgs.
Sadeghi et al.; "Smooth reverse Subdivision"; Computers and Graphics, Elsevier, GB, vol. 33, No. 3, Jun. 1, 2009; pp. 217-225, XP026448476.
Juergen et al.; "Clarification of N18979 EIF Specification Regarding Absolute Waveform Lebelling", 130. MPEG Meeting; Apr. 20-24, 2020; Alpbach (Motion Picture Expert Group or ISO/IEC JTC1/SC29/WG11), No. M53584, XP030287217 [retrieved from the internet—http://phenix.int-every.fr/mpeg/doc_end_user/documents/130_Alpbach/wg11/m5354-v1-m53584-(Clarification_N18979).zip—retrieved on Apr. 10, 2020].
M. Sattler, R. Sarlette, et R. Klein. Simple and efficient compression of animation sequences. In Eurographics Symposium on Computer Animation, pp. 209-217, Los Angeles, E'tats-Unis, 2005.
I. Guskov et A. Khodakovsky. Wavelet compression of parametrically coherent mesh sequences. In Eurographics Symposium on Computer Animation, pp. 183-192, Grenoble, France, 2004.
J.W. Cho, M.S. Kim, S. Valette, H.Y. Jung, et R. Prost. 3D dynamic mesh compression using wavelet-based multiresolution analysis. In IEEE International Conference on Image Processing, pp. 529-532, Atlanta, E'tats-Unis, 2006.
K. Mamou, T. Zaharia, F. Preteux, A skinning approach for dynamic 3D mesh com-pression, Computer Animation and Virtual Worlds, vol. 17(3-4), Jul. 2006, p. 337-346.
K. Mamou, N. Stefanoski, H. Kirchhoffer, K. Muller, T. Zaharia, F. Preteux, D. Marpe, J. Ostermann, The new MPEG-4/ FAMC standard for animated 3D mesh compression, 3DTV Conference (3DTV-CON 2008), Istanbul, Turkey, May 2008.
K. Mamou, T. Zaharia, F. Preteux, A. Kamoun, F. Payan, M. Antonini. Two optimizations of the MPEG-4 Famc standard for enhanced compression of animated 3D meshes. IEEE International Conference on Image Processing (2008).
ISO/IEC 23090-5 ISO/IEC Information technology—Coded Representation of Immersive Media—Part 5: Visual Volumetric Video-based Coding (V3C) and Video-based Point Cloud Compression (V-PCC).
K. Mammou, J. Kim, A. Tourapis, D. Podborski, K. Kolarov, "[V-CG] Apple's Dynamic Mesh Coding CfP Response," ISO/IEC JTC1/SC29/WG7/m59281, Online, Apr. 2022.
A. Tourapis, J. Kim, D. Podborski, K. Mammou, "Base mesh data substream format for VDMC ," ISO/IEC JTC1/SC29/ WG7/ m60362, Online, Jul. 2022.
Pakdel, et al.; "Incremental adaptive loop subdivision"; ICCSA 2004, LNCS 3045, pp. 237-246, 2004 [retrieved from https://giv.cpsc.ucalgary.ca/publication/c5/].
Kraus; "The Pull-Push Algorithm Revisited—Improvements, Computation of Point Densities, and GPU Implementation"; Proceedings of the Fourth International Conference on Computer Graphics Theory and Applications, pp. 179-184; [retrieved from https://www.scitepress.org/Papers/2009/17726/17726.pdf ].

(56) References Cited

OTHER PUBLICATIONS

Doggett, et al.; "Adaptive View Dependent Tessellation of Displacement Maps," Aug. 2000, Proceedings of the ACM Siggraph/Eurographics Workshop on Graphics Hardware, pp. 59-66 (Year: 2000).

Mamou, Khaled; "Multi-Resolution 3D Mesh Coding in MPEG," Dec. 2011, 2011 Visual Communications and Image Processing, p. 1-4, https://ieeexplore.leee.org/stamp/stamp.jsp?tp=&arnumber=6116054&tag=1 (Year: 2011).

* cited by examiner

APPROXIMATE HIERARCHICAL CONVEX DECOMPOSITION

BACKGROUND

Three dimensional objects may be represented in a computing system as a mesh of polygons (e.g., triangles), a point cloud, or other suitable representation. In some applications, for example video games or computer animation, detecting collisions between such objects may be desirable or even essential. To speed computational detection of such collisions, simplified representation of the 3D objects may be used. However, in some applications, many heretofore used simplification techniques have resulted in sub-optimal performance (false collision detection, for example).

SUMMARY

Thus, what is needed in the art is an improved technique for accurately representing 3D objects in a simplified manner that allows for improved accuracy of collision detection and similar function while also reducing computational complexity to a level that can be accommodate by the computing device of interest.

A method of decomposing a three-dimensional representation of an object into a plurality of convex hulls can include instantiating a cluster priority queue in a computing system memory that initially contains a cluster corresponding to the three-dimensional representation of the object, computing with a processor of the computing system a concavity measure for each cluster in the cluster priority queue, and, for the cluster with the highest concavity measure: (1) computing with the processor a cut plane that divides the cluster corresponding to the three-dimensional representation of the object into two new clusters, each of the two new clusters having a corresponding convex hull, wherein computing a cut plane includes performing a hierarchical search of potential cut planes, (2) removing the cluster corresponding to the three-dimensional representation of the object from the cluster priority queue, and (3) adding the two new clusters to the cluster priority queue.

Performing a hierarchical search of potential cut planes can further include a recursive cut plane selection procedure that minimizes concavity of all produced clusters after applying a predetermined number of successive cut planes. Computing with the processor of the computing system a cut plane can further include accepting user input to select or modify the computed cut plane. Performing a hierarchical search of potential cut planes can further include: (1) determining a first plurality of cut plane orientations and for each of the first plurality of cut plane orientations, computing one or more cost functions associated with the cut plane orientation, and selecting one of the first plurality of cut plane orientations having a lowest cost as determined by the one or more cost functions; and (2) determining a second plurality of cut plane orientation based on the selected one of the first plurality of cut plane orientations, for each of the second plurality of cut plane orientations, computing one or more cost functions associated with the cut plane orientation, and selecting one of the second plurality of cut plane orientations having a lowest cost as determined by the one or more cost functions. The first and second pluralities of cut plane orientation can be selected based on successive subdivisions of a unitary octahedron. The one or more cost functions can include a balance cost function that prefers cut planes that produce approximately equally sized clusters. The one or more cost functions can include a cross-section cost function that prefers cut planes that minimize a cross-sectional area of the intersection of the cut plane and the input cluster. The one or more cost functions can include a compactness cost function that prefers cut planes that minimize a sum of surface areas of resulting clusters.

The above-described method can further include, for each pair of clusters in the priority queue, determining whether the pair of clusters can be merged without increasing concavity above a predetermined threshold. If a pair of clusters in the priority queue can be merged without increasing concavity above a predetermined threshold, the method can still further include merging the pair of clusters, removing the pair of clusters from the priority queue, and placing the merged cluster in the priority queue. The method can further include accepting user input with respect to one or more cluster pairs to merge and—for each cluster pair indicated by the user to be merged—merging the pair of clusters removing the pair of clusters from the priority queue and placing the merged cluster in the priority queue.

A method of decomposing a three-dimensional representation of an object into a plurality of convex hulls can include computing with a processor of a computing system a cut plane that divides a cluster stored in a memory of the computing system and corresponding to the three-dimensional representation of the object into two new clusters. Each of the two new clusters can have a corresponding convex hull. Computing a cut plane can include performing a hierarchical search of potential cut planes. Performing a hierarchical search of potential cut planes can include a recursive cut plane selection procedure that minimizes concavity of all produced clusters after applying a predetermined number of successive cut planes. Computing with the processor of the computing system a cut plane can further include accepting user input to select or modify the computed cut plane.

Performing a hierarchical search of potential cut planes can further include: determining a first plurality of cut plane orientations; computing one or more cost functions associated with the cut plane orientation for each of the first plurality of cut plane orientations; selecting one of the first plurality of cut plane orientations having a lowest cost as determined by the one or more cost functions; determining a second plurality of cut plane orientation based on the selected one of the first plurality of cut plane orientations; for each of the second plurality of cut plane orientations, computing one or more cost functions associated with the cut plane orientation; and selecting one of the second plurality of cut plane orientations having a lowest cost as determined by the one or more cost functions. The first and second pluralities of cut plane orientation can be selected based on successive subdivisions of a unitary octahedron. The one or more cost functions can include one or more cost functions selected from the group consisting of: (1) a balance cost function that prefers cut planes that produce approximately equally sized clusters, (2) a cross-section cost function that prefers cut planes that minimize a cross-sectional area of the intersection of the cut plane and the input cluster, and (3) a compactness cost function that prefers cut planes that minimize a sum of surface areas of resulting clusters.

Performing a hierarchical search of potential cut planes can further include a recursive cut plane selection procedure that minimizes concavity of all produced clusters after applying a predetermined number of successive cut planes. The above-described method can further include—for each pair of clusters in the priority queue—determining whether the pair of clusters can be merged without increasing concavity above a predetermined threshold and, if a pair of clusters in the priority queue can be merged without increasing concavity above a predetermined threshold: merging the pair of clusters, removing the pair of clusters from the priority queue, and placing the merged cluster in the priority queue. The method can still further include accepting user input with respect to one or more cluster pairs to merge, and, for each cluster pair indicated by the user to be merged: merging the pair of clusters, removing the pair of clusters from the priority queue and placing the merged cluster in the priority queue.

A method of performing a hierarchical search of potential cut planes for decomposing a three-dimensional representation of an object into a plurality of convex hulls can include determining a first plurality of cut plane orientations; for each of the first plurality of cut plane orientations, computing one or more cost functions associated with the cut plane orientation; selecting one of the first plurality of cut plane orientations having a lowest cost as determined by the one or more cost functions; determining a second plurality of cut plane orientation based on the selected one of the first plurality of cut plane orientations; for each of the second plurality of cut plane orientations, computing one or more cost functions associated with the cut plane orientation; and selecting one of the second plurality of cut plane orientations having a lowest cost as determined by the one or more cost functions.

Performing a hierarchical search of potential cut planes can include a recursive cut plane selection procedure that minimizes concavity of all produced clusters after applying a predetermined number of successive cut planes. Computing with a processor of the computing system a cut plane can further include accepting user input to select or modify the computed cut plane. The first and second pluralities of cut plane orientations can be selected based on successive subdivisions of a unitary octahedron. The one or more cost functions can include one or more cost functions selected from the group consisting of: a balance cost function that prefers cut planes that produce approximately equally sized clusters; a cross-section cost function that prefers cut planes that minimize a cross-sectional area of the intersection of the cut plane and the input cluster; and a compactness cost function that prefers cut planes that minimize a sum of surface areas of resulting clusters.

DETAILED DESCRIPTION

Figure 1:
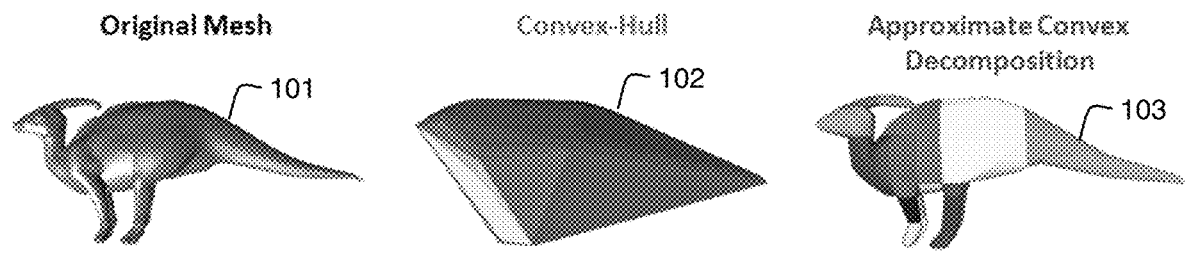
FIG. 1 illustrates a 3D object/mesh with a corresponding convex hull and a corresponding approximate convex decomposition.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

As discussed above, collision detection may be important for many applications, including for example, realistic physical interactions in video games and computer animation. To ensure real-time interactivity with a player/user, video game and 3D modeling software developers usually approximate the 3D models representing objects composing the scene (such as animated characters, static objects, etc.) by a set of simple convex shapes such as ellipsoids, capsules, or convex hulls. FIG. 1 illustrates an example of a 3D object 101, which can be represented as a convex hull 102, which can be the smallest convex volume that contains the original object. FIG. 1 also illustrates an approximate convex decomposition 103 representing 3D object 101, which uses multiple convex shapes rather than a single hull to represent and contain the original object 101. In some cases, either form of simplified representation can provide poor approximations of the actual surface. Concave surfaces, in particular, may be particularly difficult to represent using convex shapes, and the resulting poor degree of approximation can cause false collision detection and potentially other undesirable effects.

Figure 2:
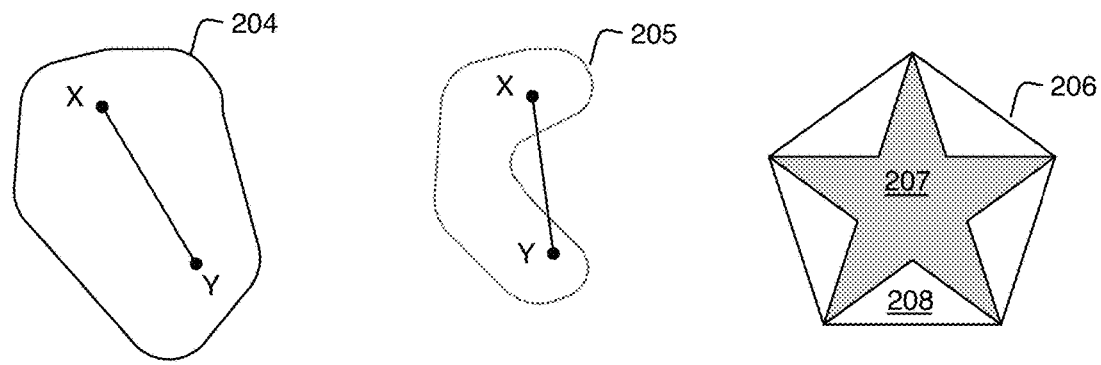
FIG. 2 illustrates various concepts relating to convexity and concavity for 2D objects, which can be extended to 3D objects.

FIG. 2 illustrates in two dimensions a few pertinent concepts for the present disclosure. More specifically, an object or shape 204 is said to be convex if it contains all lines directly connecting any two points within the object or shape. Conversely, an object or shape 205 is concave if it does not contain all lines directly connecting any two points X, Y within the object or shape. The concavity of an object is a measure the difference between the area (or volume) of the object and the smallest convex shape containing the area or volume. Thus star 207 is a concave object, pentagon 206 is the smallest convex shape containing the area or volume, and the sum of unshaded areas 208 provide a measure of concavity. (All of the foregoing concepts may be extended to three dimensional, and in fact higher dimensional, objects.)

Figure 3:
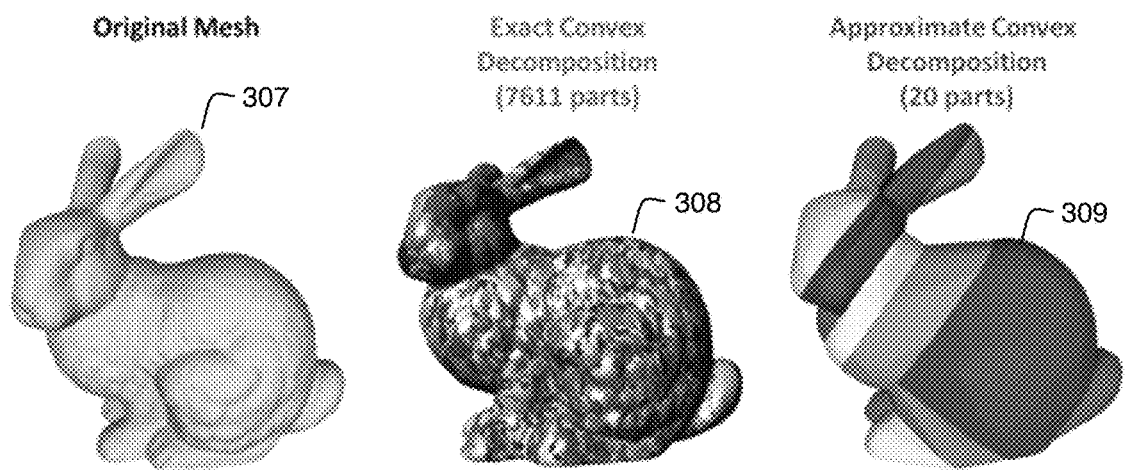
FIG. 3 illustrates a 3D object mesh with a corresponding exact convex decomposition and an approximate convex decomposition.

FIG. 3 illustrates an alternative to the convex hull approach described above with respect to FIG. 1, in which an exact convex decomposition 308 of an object represented by mesh 307 can be computed. This exact convex decomposition may exactly match the shape of the original mesh, but results in a relatively high number of parts. More specifically, computing an exact convex decomposition can include partitioning the input mesh 307 into a minimal set of convex sub-surfaces. Exact convex decomposition algorithms are NP-hard and therefore may not be practical for many applications in which computational resources and/or time to perform the required calculation are limited. To overcome these limitations, the exact convexity constraint may be relaxed and an approximate convex decomposition 309 of mesh 307 can be computed instead. In such cases, the goal can be to determine a partition of the mesh triangles with a minimal number of clusters, while ensuring that each cluster has a concavity lower than a user defined threshold.

Pre-existing approximate convex decomposition techniques have included a variety of deficiencies, including for example:

- Requiring high resolution voxelization or tetrahedralization, which can lead to high computational complexity and high memory requirements.
- Considering only axis-aligned cut planes to reduce complexity, which can lead to sub-optimal decompositions.
- Failing to robustly handle meshes with cracks (i.e., not watertight meshes), potentially treating them as open surfaces.
- Potentially over-decomposing convex sub-parts because of approximation errors introduced by voxelization/tetrahedralization.
- Making sub-optimal decomposition decisions because cut planes are determined one at a time (i.e., with no look-ahead strategy).
- Handling mainly or only 3D polygonal meshes (e.g., being unable to handle implicit functions or point clouds).
- Not supporting semi-automatic decompositions (i.e., not providing a user with the ability to alter or guide the decomposition process).
- Employing decomposition algorithms that are fixed, preventing improvement by learning from user-inputs or other inputs/measures.

Disclosed herein are various improved decomposition techniques that may address one or more of the foregoing deficiencies.

Figure 4:
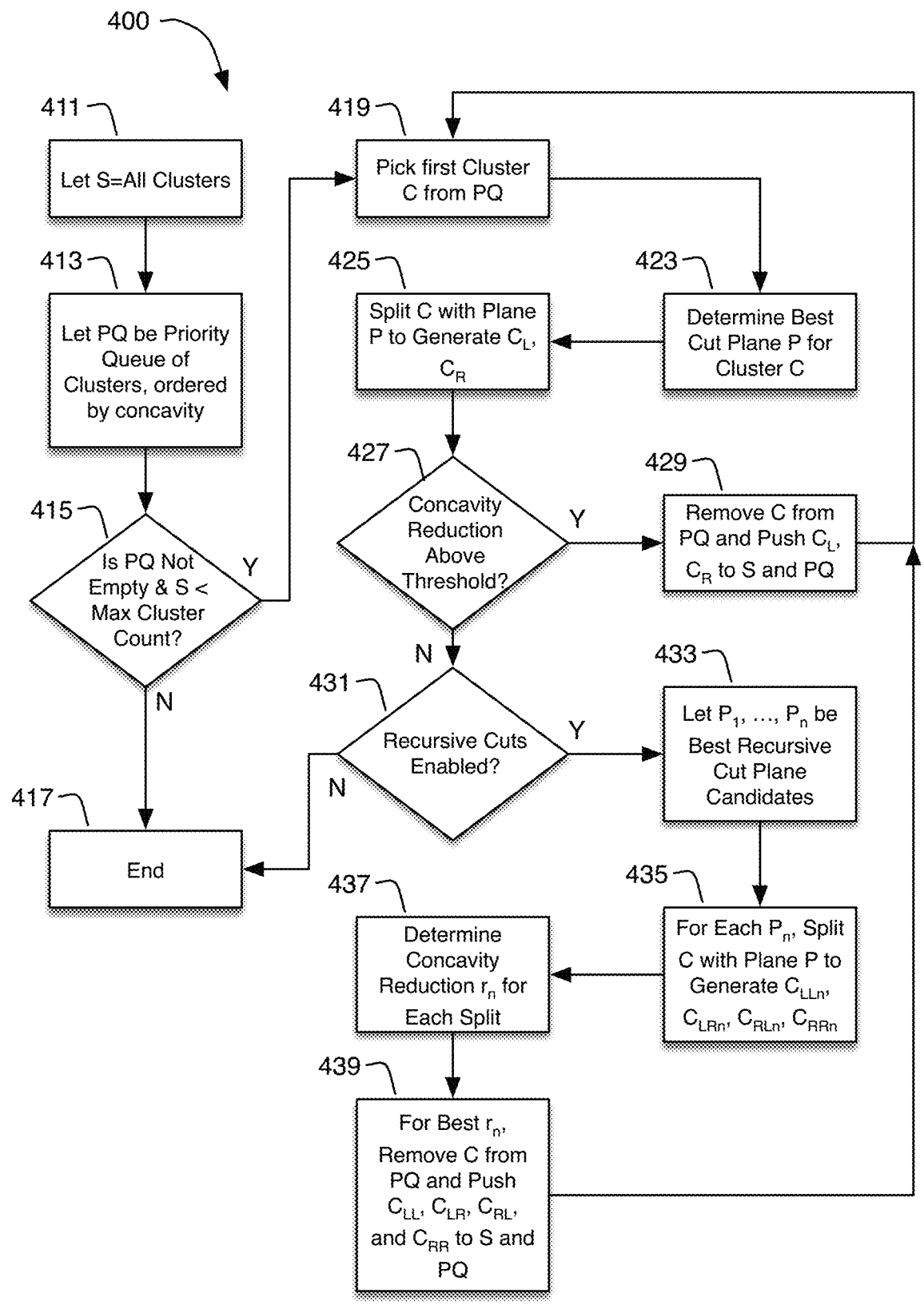
FIG. 4 illustrates an algorithm for decomposing a 3D object into a plurality of approximate convex clusters.

Appendix 1 lists an improved decomposition algorithm in pseudo-code form. FIG. 4 illustrates the improved decomposition algorithm as a simplified flow chart. The following description focuses on the flow chart, but it will be appreciated that the pseudo code listing also depicts one technique for implementing the flow chart and may include additional details that may be optional for some embodiments. Such implementation may be provided as software running on a programmed processor, including one located in a server, desktop computer, portable computer, mobile electronic device (e.g., smartphone or tablet computer), etc. Additionally, or alternatively, one or more components of the algorithm could be implemented using hardware assistance or acceleration, e.g., in a graphics processing unit, image processing engine, or other suitable electronic hardware. An exemplary system that can include such implementations is described below with respect to FIG. 10.

FIG. 4 illustrates a flowchart 400 of a decomposition algorithm. Beginning at block 411, the set of all clusters can be represented by "S". In block 413, "PQ" can be a priority queue of the clusters in S, ordered by their concavity. In block 415, it can be determined whether PQ is empty and/or if S has reached the maximum cluster count. If so, then the algorithm can end. Otherwise, if the priority queue PQ is not empty and the maximum cluster count has not been reached, flow proceeds to block 419. In block 419, a cluster C can be selected from the priority queue, i.e., the cluster with the highest concavity. In block 423, the best cut plane P for cluster C can be determined. (A best cut plane determination algorithm is described in greater detail below with respect to Appendix 2 and FIG. 7.). Then in block 425, the selected cluster C can be split with the selected best cut plane P to generate two new clusters CL, CR. (Although "left" and "right" nomenclature is used, it should be appreciated that any orientation of cut plane could be used.)

In block 427, it can be determined whether the cut performed in block 425 has produced a net concavity reduction that is above a selected threshold. This can ensure that the cut performed is "worthwhile." Turning back to Appendix 1, one exemplary concavity measure is given by:

$$\left| \frac{\text{Concavity } (C) - \text{Concavity } (C_L) - \text{Concavity } (C_R)}{\text{Concavity } (C)} \right| \geq$$

$$\text{MinConcavityReduction}$$

where Concavity is a concavity measurement function that, as described above with respect to FIG. 2, measures the volume difference between the convex decomposition clusters and the original cluster and MinConcavityReduction is the threshold. Then, if an acceptable concavity reduction is provided by the split, the cluster C can be removed from priority queue PQ and split clusters CL and CR can be returned to the priority queue. Following this, flow can return to block 419, in which the next cluster C having the highest concavity can be selected. It should be appreciated that this could be either a pre-existing cluster member of S or one of the newly added clusters produced by the split.

Back at block 427, if the concavity reduction resulting from the cut is not above the selected threshold, then in block 431, it can be determined whether recursive cuts, i.e., performing multiple cuts in sequence are enabled. If not, then the process may end, as the algorithm cannot reduce the concavity of the cluster having the highest concavity, meaning there is nothing further to do. Otherwise, if recursive cuts are enabled, in block 431, P1, P2, . . . Pn can be best recursive cut plane candidates. For each candidate, the selected cluster C can be split to generate recursively split planes CLLn, CLRn, CRLn, and CRRn. (Again, left/right nomenclature is used, but it should be appreciated that the cut plane orientation can be arbitrary.) For each set of recursive splits, a concavity reduction rn can be determined, and for the recursive splits having the best concavity reduction, the resulting split clusters CLL, CLR, CRL, and CRR can be returned to the priority queue PQ and set of all clusters S in place of the source cluster C. Further details of recursive cut techniques are described below with respect to FIG. 8.

Additional aspects may be applied in conjunction with the above-described algorithm. For example, to handle meshes with cracks (i.e., not watertight meshes) and to be able to extend the algorithm to surface representations other than polygonal meshes (e.g., point clouds), a "winding number" may be employed to derive an implicit representation of the surface. Winding numbers are a mathematical construct known to those skilled in the art, and examples of the application of winding numbers to 3D graphics processing are described in "Fast Winding Numbers for Soups and Clouds" by Gavin Barill, et al., which may be found at: https://www.dgp.toronto.edu/projects/fast-winding-numbers/fast-winding-numbers-for-soups-and-clouds-siggraph-2018-barill-et-al.pdf. In short, a winding number is a number that defines how many times a curve (or, more generally, a surface) wraps around or encompasses a point. Thus, any point may be assigned a winding number derived value that indicates whether the point is inside or outside the surface.

For example, each 3D point Q can be assigned the scalar value:

$$f(Q)=W(Q)-\tfrac{1}{2},$$

where W(Q) is the winding number of Q. If a cluster C was generated by applying n cut planes $(P_i)_{i=1 \ldots n}$ to the initial surface, the value of the implicit function $f_C$ associated with C at the 3D point Q can be given by:

$$f_C(Q) = \begin{cases} -1 & \text{if } d(Q, P_i) < 0 \; i = 1 \ldots n \\ W(Q) - \tfrac{1}{2} & \text{otherwise} \end{cases}$$

Where $d(Q,P_i)$ is the signed distance of Q with respect to the plane $P_i$.

Figure 5:
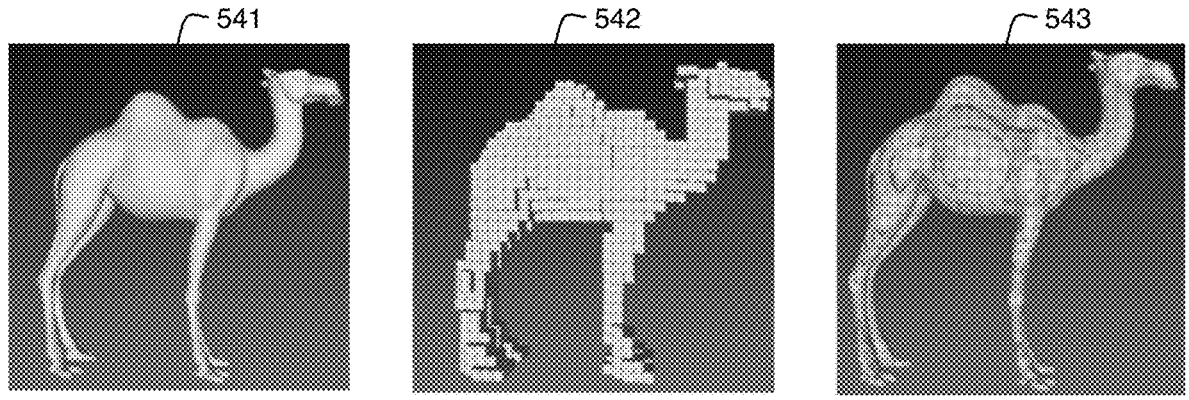
FIG. 5 illustrates a 3D object that is voxelized and represented by a plurality of convex pieces.

FIG. 5 depicts the advantages of the above-described approach. Using a convex hull based approximation of the input surface 541 can allow avoidance high resolution voxelization or tetrahedralization, while offering a more accurate approximation 543 of the input surface S. The idea is to approximate surface S (541) with a set of convex pieces. Computing this initial decomposition makes it possible to support any surface representation (e.g., polygonal meshes, implicit surfaces, point clouds, etc.). To compute the initial decompositions various approaches are possible, for example:

Voxel-grid guided decomposition: The volume may be segmented into a relatively low-resolution set of volumes 542. Then, for each voxel intersecting the surface, a convex hull of the intersection between the volume enclosed by the surface and the voxel. The union of the volumes defined by these convex hulls provide an approximation of the initial volume bounded by S. It should be noted that that the grid could be uniform or not.

Figure 6:
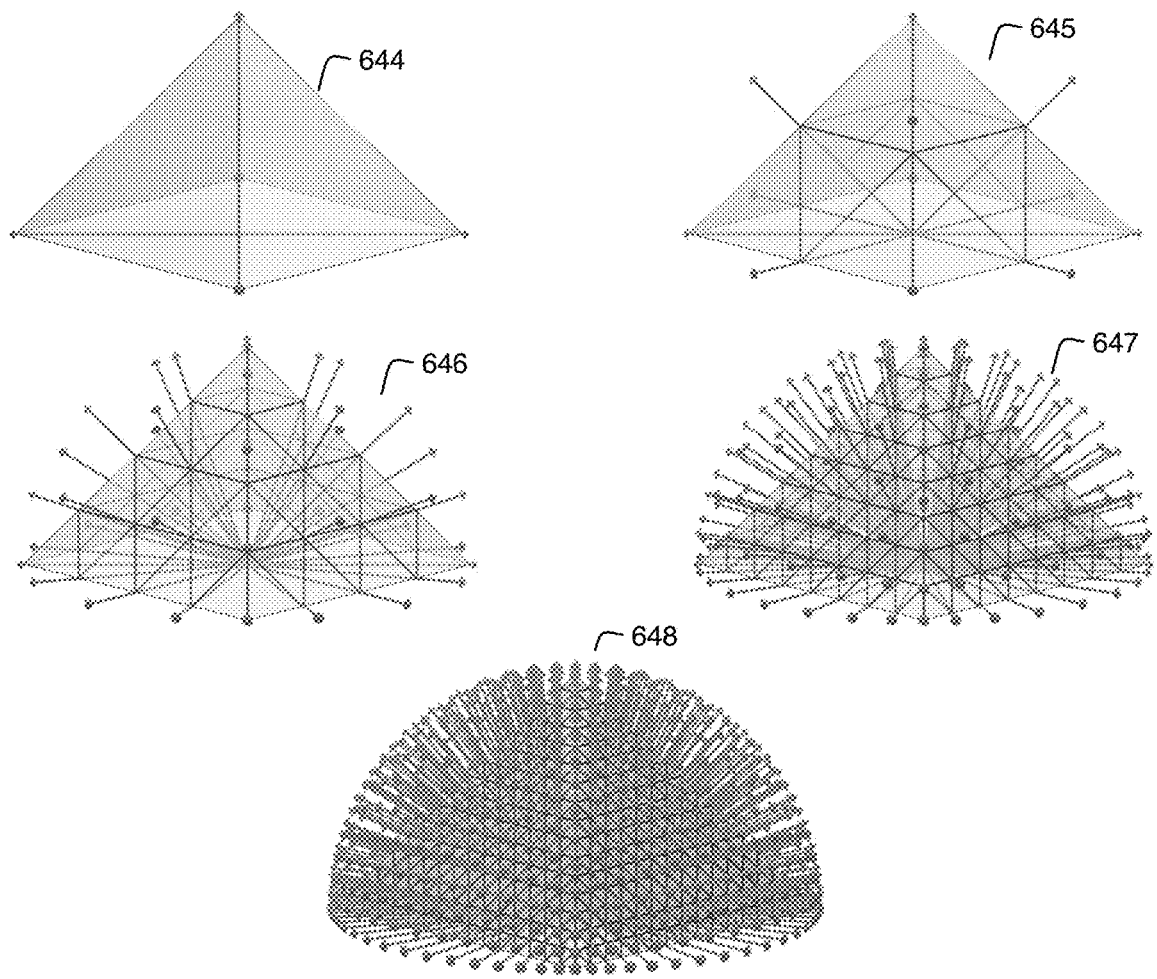
FIG. 6 illustrates a technique for subdividing a half unit octahedron to generate a hierarchy of prospective cut planes.

The voxel-grid guided decomposition could be extended to leverage an octree structure (sparse voxelization) with more refinement around the blocks that intersect the surface. This can allow for reduction of memory requirements and the computational complexity of the ACD process. Exemplary sparse voxelization arrangements are described in https://www.seas.upenn.edu/~pcozzi/OpenGLInsights/OpenGLInsights-SparseVoxelization.pdf As noted above, performance of the subdivision algorithm may be improved by using arbitrary cut plane orientations rather than the axially aligned cut planes of prior art methods. FIG. 6 illustrates an exemplary hierarchical structure of orientation that may be used to accelerate the search for a best cut plane orientation. The hierarchical structure can be based on normal vectors to the faces of a half unitary octahedron 644. (A half octahedron may be used because the normal vectors of the other half are in the same orientation, just with a different sign.) The initial level 645 of the hierarchy $H_0$ corresponds to the vertices of a half unitary octahedron. Subsequent hierarchy levels $(H_i)_i$ (646-648) can be obtained by successively applying a 4-1 subdivision. Thus, $H_1$ (646) can include four additional orientations around a selected normal from $H_0$, with $H_2$ 657 including four additional orientations around a selected normal from $H_1$, and so on. The hierarchical search procedure to determine a cut plane orientation is further described below with reference to Appendix 2 and FIG. 7.

Figure 7:
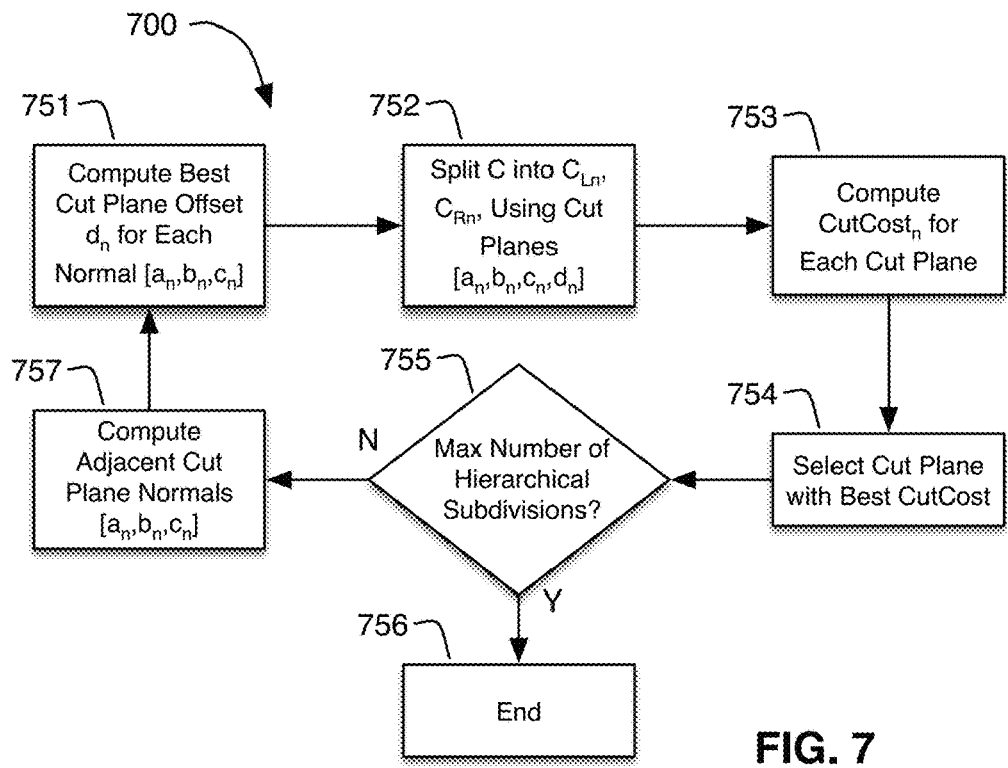
FIG. 7 illustrates an algorithm for determining a best cut plane for subdividing a 3D object into a plurality of approximate convex clusters.

Appendix 2 lists in pseudo-code form a best cut plane selection algorithm that may be used in connection with the decomposition algorithm described above. FIG. 7 illustrates the best cut plane selection algorithm as a simplified flow chart. The following description focuses on the flow chart, but it will be appreciated that the pseudo code listing also depicts one technique for implementing the flow chart and may include additional details that may be optional for some embodiments. As described above, such implementation may be provided as software running on a programmed processor. Additionally, or alternatively, one or more components of the algorithm could be implemented using hardware assistance or acceleration, e.g., in a graphics processing unit, image processing engine, or other suitable electronic hardware. An exemplary system that can include such implementations is described below with respect to FIG. 10.

FIG. 7 illustrates a flow chart 700 of a best cut plane selection algorithm that may be employed in conjunction with the segmentation algorithm described above. Beginning at block 751, a best cut plane offset value dn can be computed for the offset plane corresponding to each normal associated with the current iteration through the hierarchy of levels. In the above-described example using subdivisions based on half unitary octahedrons, this can correspond to four cut plane directions. Once an associated offset value dn (i.e., the position of the plane along the direction defined by the normal vector) is determined for each potential orientation, in block 752, the selected cluster C may be split into sub-clusters CLn and CRn using the selected cut planes (where n corresponds to one of the cut planes). In block 753, a cost function value can be computed for the cuts associated with the respective cut planes. (Exemplary cost functions are described in greater detail below.) The cut plane with the lowest cost function value can be selected as the best cut plane from among the present candidates in block 754. Then, in block 755, it may be determined whether the algorithm has progressed completely through the levels of the hierarchical selection arrangement (e.g., the successive subdivisions shown in FIG. 6). If so, then the process can end at block 756, with the best selected cut plane being used in the remainder of the above-described algorithm. Otherwise, the algorithm can proceed to the next level of the hierarchy by computing the adjacent cut planes for the current "best" cut plane in block 757, with these new adjacent cut plane candidates being passed to block 751, discussed above.

As mentioned above, a cost function value may be computed for each cut plane to determine which of the cut plane candidates is the "best." There are various cost functions that could be used, either separately or in combination. For example, a BalanceCost function could be defined to prefer cut planes that produce subdivided hulls having the most equal volumes. Such a cost function can be defined as:

$$BalanceCost(C, C_L, C_R) = \frac{|Vol(C_L) - Vol(C_R)|}{Vol(C_0)}$$

where $C_0$ is the cluster being subdivided (i.e., the input mesh before any subdivision), $C_L$ and $C_R$ are the respective clusters defined by a split along the selected cut plane, and Vol is the volume of the respective cluster. A cross-section cost function can be defined to prefer cut planes that minimize the cross-sectional area of the intersection of cut plane P with cluster C. For example, such a cost function can be defined as:

$$CrossSectionCost(C, P) = \frac{CSA(C, P)}{0.5 \cdot SA(C_0)}$$

where CSA(C, P) is the cross sectional area defined by the intersection of cluster C with cut plane P and SA(C0) is the surface area of the input cluster. Finally, a compactness cost function can be defined to prefer cut planes that minimize the sum of the surface areas of the resulting split planes $C_L$ and $C_R$. Such a cost function can be defined as:

$$CompactnessCost(C, C_L, C_R) = \frac{SA(C_L) + SA(C_R) - SA(C)}{SA(C_0)}$$

As noted above, these or other cost functions could be used as appropriate for a given application. Additionally, costs associated with each respective cost function may be combined to define an "aggregate" cost of a particular cut plane split, with the respective individual cost functions weighted accordingly. In one embodiment, an aggregate cut cost function can be defined as:

CutCost =

ConvavityCost · (1 + BalanceCost + CompactnessCost + CrossSectionCost)

where ConcavityCost for a plane is the sum of the corresponding left and right cluster concavities, and the remaining cost functions are as described above.

Figure 8:
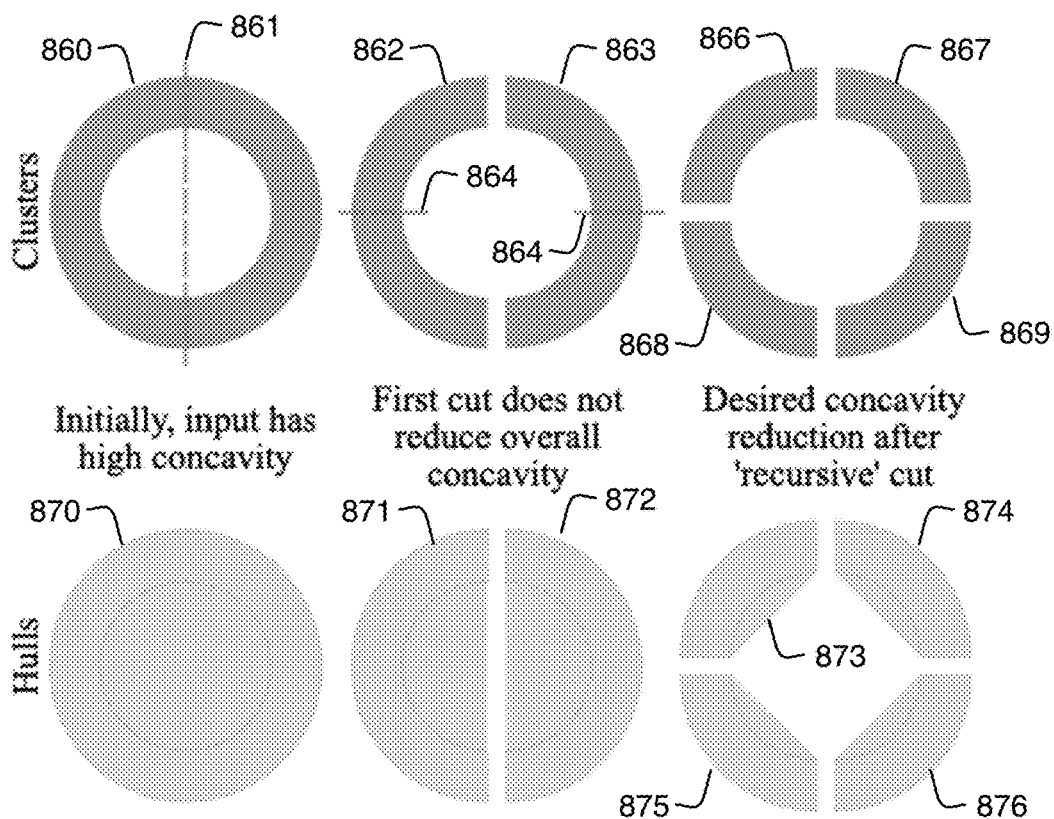
FIG. 8 illustrates a recursive cut plane selection technique.

In some cases, selecting one cut plane at a time may lead to sub-optimal decisions. For example. Thus, in at least some applications it may be desirable to provide a recursive cut plane selection procedure, which can optimize the concavity of all produced clusters after applying a selected number of m consecutive cut planes. An example is shown with respect to FIG. 8. In FIG. 8, a cluster 860 is depicted as a two-dimensional ring shape having a hollow center portion (although it will be appreciated that the discussed concepts can be extended to three-dimensional or higher order clusters). Cluster 860 can correspond to a convex hull 870, which completely contains cluster 860. Dividing cluster 860 along cut plane 861 can produce two new clusters 862 and 863, corresponding to hulls 871 and 872. In this case, there is no net reduction in concavity, as hulls 871 and 872 still contain the entirety of the space defined by the interior of cluster 860. Thus, a single level cut plane selection might reject this cut, even though a subsequent (recursive) cut along cut plane 864 can produce clusters 866, 867, 868, and 869 that correspond to hulls 873, 874, 875, and 876 in which the net concavity is substantially reduced. Thus, it may be desirable to consider recursive cut planes in which successive cuts are made with cut planes in pre-selected orientations with respect to the initial cut plane in determining the "best" cut plane(s).

Figure 9:
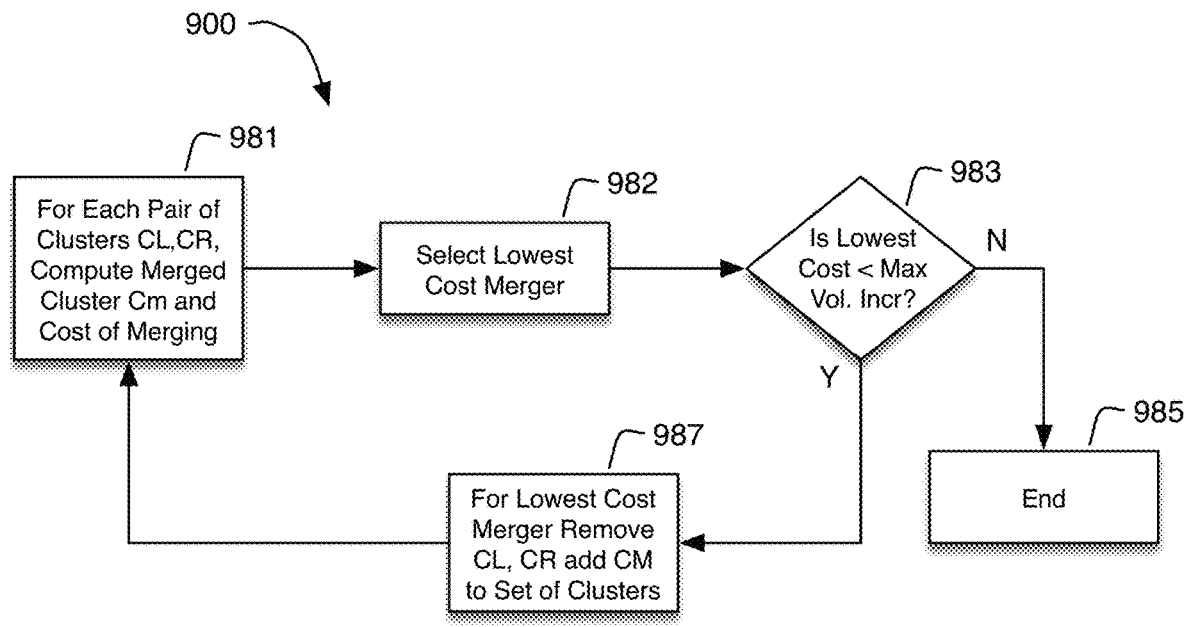
FIG. 9 illustrates a cluster merging algorithm.

Depending on the vagaries of the particular cluster to be subdivided and the particulars of the algorithm used, it is possible that the cluster may be over-segmented. To remediate such over segmentation, a cluster merging procedure may be employed. The cluster merging procedure can have the objective of merging clusters without introducing a significant increase in concavity. Appendix 3 and FIG. 9 describe an exemplary cluster merging algorithm. More specifically, Appendix 3 lists in pseudo-code form a cluster merging algorithm that may be used in connection with the decomposition algorithm described above. FIG. 9 illustrates the cluster merging algorithm as a simplified flow chart. The following description focuses on the flow chart, but it will be appreciated that the pseudo code listing also depicts one technique for implementing the flow chart and may include additional details that may be optional for some embodiments. As described above, such implementation may be provided as software running on a programmed processor. Additionally, or alternatively, one or more components of the algorithm could be implemented using hardware assistance or acceleration, e.g., in a graphics processing unit, image processing engine, or other suitable electronic hardware. An exemplary system that can include such implementations is described below with respect to FIG. 10.

FIG. 9 illustrates a flowchart 900 of a cluster merging algorithm. Beginning with block 981, for each respective pair of clusters CL, CR, a merged cluster Cm can be computed, along with a corresponding cost of merging the clusters. The merger cost may be defined as a function of the increase in total concavity resulting from the merger. From among the mergers of the respective pairs of clusters, the merger having the lowest cost may be selected (block 982), and it can be determined (block 983) whether the selected lowest cost merger remains below a selected threshold. This threshold may be thought of as a maximum increase in concavity or a corresponding aggregate value increase. If the lowest cost merger is not less than the maximum cost, then the merger algorithm may end (block 985) as any further merger of clusters will result in an undesirable increase in concavity. Otherwise, if the lowest cost is below the selected threshold, the merged clusters CL, CR can be removed from the set of clusters S and the merged cluster Cm can be put into the set of clusters S.

In some cases, automatic decompositions may be improved by user inputs. Thus, the above-described techniques may be implemented as semi-automatic procedures in which a user could alter/refine the choice of a cut plane at any point of the decomposition process. For example, in the algorithm of FIG. 4, a user could supply the initial cut plane (or the cut plane at any subsequent iteration). Additionally, or alternatively, the user could supply a sequence of respective cut planes in block 433. Similarly, in the algorithm of FIG. 7, a user could supply an initial cut plane orientation at varying levels of the hierarchy or could alter the number of hierarchical subdivisions or the number of subdivisions associated with each layer of the hierarchy. In some embodiments, the user could also provide varying degrees of input to the cluster merging algorithm as described in FIG. 9. For example, the user could provide input to merge two or multiple clusters. A final decomposition may be obtained by switching multiple times between automatically computed cut/merge decisions and user-guided or provided cut/merge decisions.

Figure 10:
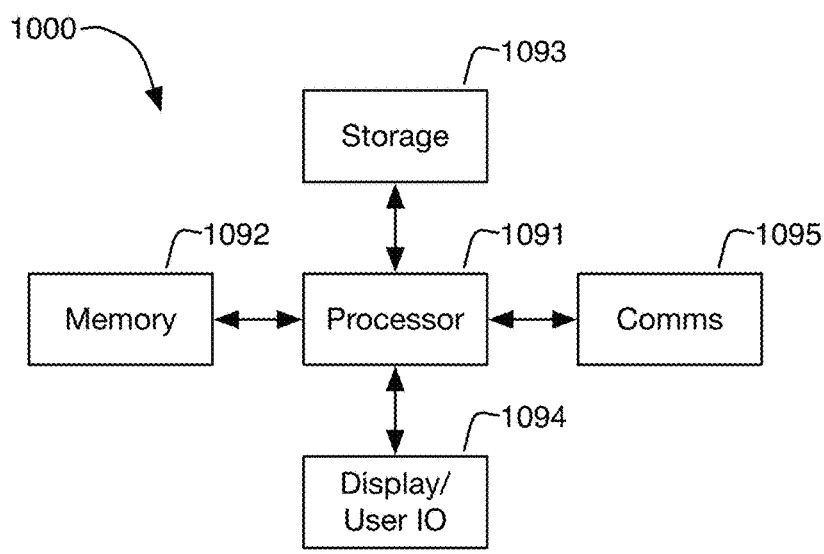
FIG. 10 illustrates a simplified block diagram of an exemplary computing system in which the algorithms described herein may be employed.

FIG. 10 illustrates a high-level block diagram of a computing system 1000 that may be employed to implement the graphics processing algorithms described herein. Processing system 1000 can include a processor 1091. This processor can take on a variety of forms, including one or more processors of one or more processor types, including without limitation, microprocessors, graphics processing units (GPUs), image processing units (IPUs), digital signal processors (DSPs), etc. The processor(s) may communicate with memory 1092, which may be in the form of random access memory. In some cases, different processor components may have access to different memory, such as dedicated memory for the CPU and dedicated memory for the GPU or may share access to a unified memory. Memory 1092 can be used to store both the data being operated on as well as program instructions implementing the various algorithms described herein. The processor may also communicate with storage 1093. Storage 1093 may be used for longer term storage of data as well as program instructions, and may include solid state storage, such as NAND flash storage, or other forms of storage such as magnetic storage.

Processor 1091 may also communicate with a display/user input output system 1094. Depending on the particular application and purpose of computing system 1000, varying display types and technologies may be provided, and different level of user input output (I/O) devices may be provided. For example, for a mobile phone or tablet computer, the display/user IO system can include an LCD or OLED touchscreen. In the case of a notebook computer, the display/user IO system can include an LCD or OLED display together with keyboard and pointer devices (such as a trackpad) for accepting user input, including without limitation the user inputs described above for guiding the selection of cut planes or merger of clusters, etc. In the case of a desktop computer, the display/user IO system can be expanded further to include multiple displays, a keyboard, various pointer devices such as trackpads, mice, digitizer/graphics tablets, etc. (It will also be appreciated that such IO devices may be used with other computer types as well.). Finally, processor 1091 can communicate with Comms system 1095, which can include network or other interfaces for communicating with other devices, including for receiving or transmitting cluster/mesh data to other systems. Such comms systems can include wired interfaces, such as Ethernet, serial ports, etc. or wireless interfaces such as WiFI, Bluetooth, NFC, etc.

It is anticipated that various permutations of the algorithms described herein can be implemented on a computing system 1000 to improve the functioning of such system by addressing one or more of the above-described deficiencies of pre-existing convex decomposition techniques. That said, it is also intended that such algorithms be used to improve the performance of any computing system to which they are applicable for improving the processing of three-dimensional image data by improving a convex decomposition process.

Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation.

It is the intent of the present disclosure that personal information data, if any, should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The foregoing describes exemplary embodiments of approximate convex decomposition techniques for three-dimensional object representation in a computing system. Such techniques may be used in a variety of applications but may be particularly advantageous when used in conjunction with improving the performance of collision detection and similar algorithms for 3D gaming, animation, and similar applications. However, any system for which improved segmentation of 3D graphics objects is desired may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

APPENDIX 1

```
function AUTOMATICSPLITCLUSTERS ( )
    let S = the list of all clusters
    let PQ = a priority queue of clusters, where clusters with higher
    concavity have higher priority
    Add all elements of S to PQ
    while PQ is not empty and [S] < maxClusterCount do
        let C = PQ.pop( )
        let P = BestCutPlaneForCluster(C)
        let (C_L, C_R) = C.SplitWithPlane(P)
        if [Concavity(C) − Concavity(C_L) − Concavity(C_R)]/Concavity(C) ≥
        minConcavityReductionPerSplit then
            S.remove(C)
            S.push(C_L, C_R)
            PQ.push(C_L, C_R)
        else if recursiveCutsEnabled and [S] + 3 ≤ maxClusterCount then
            let P_1, P_2, . . . P_k = BestRecursiveCutPlaneCandidates(C)
            (C_LL, C_LR, C_RL, C_RR) :=_0
            r_best := −∞
            for i ∈ 1, 2, . . . , k do
                let (C_L^i, C_R^i) = C.SplitWithPlane(P_i)
                let P_L^i = BestCutPlaneForCluster(C_L^i)
```

APPENDIX 1-continued

```
let P_R^i = BestCutPlaneForCluster(C_R^i)
let (C_LL^i, C_LR^i) = C_L^i.SplitWithPlane(P_L^i)
let (C_RL^i, C_RR^i) = C_R^i.SplitWithPlane(P_R^i)
```

$$\text{let } r = \frac{\text{Concavity}(C) - \text{Concavity}(C_{LL}^i) - \text{Concavity}(C_{LR}^i) - \text{Concavity}(C_{RL}^i) - \text{Concavity}(C_{RR}^i)}{\text{Concavity}(C)}$$

```
          if r > r_best then
              (C_LL, C_LR, C_RL, C_RR) := (C_LL^i, C_LR^i, C_RL^i, C_RR^i)
              rbest := r
          end if
      end for
      if rbest ≥ minConcavityReductionPerSplit then
          S.remove(C)
          S.push(C_LL, C_LR, C_RL, C_RR)
          PQ.push(C_LL, C_LR, C_RL, C_RR)
      end if
   end if
end while
end function
```

APPENDIX 2

```
function BEST CUT PLANE FOR CLUSTER ( C )
    let j = 2
    let k = 4
    P_best = [a_best, b_best, c_best, d_best] := ∅
    cost_best = ∞
    for each normal [a, b, c] in H_{j-1} do
        let d = BestCutPlaneOffsetForNormal(C, [a, b, c])_
        let (C_L, C_R) = C.SplitWithPlane([a, b, c, d])
        If CutCost(C, C_L, C_R) < cost_best then
            P_best := [a, b, c, d]
            cost_best := CutCost(C, C_L, C_R)
        end if
    end for
    for i = j; i ≤ k; i := i + 1 do
        let N = the set of cut directions adjacent to [a_best, b_best, c_best, d_best] in
        H_i
        for each [a, b, c] ∈ N do
            let d = BestCutPlaneOffsetForNormal(C, [a, b, c])_
            let (C_L, C_R) = C.SplitWithPlane([a, b, c, d])
            If CutCost(C, C_L, C_R) < cost_best then
                P_best := [a, b, c, d]
                cost_best := CutCost(C, C_L, C_R)
            end if
        end for
    end for
    return P_best
end function
```

APPENDIX 3

```
function AUTOMATIC MERGE CLUSTERS ( )
    let S = the list of all clusters
    while |S| > 1 do
        (C_L^best, C_R^best) := (∅, ∅)
        cost_best := ∞
        for each pair of clusters C_L, C_R ⊆ S do
            let C_M = MergeClusters(C_L, C_R)
            let cost = (Vol(Hull(C_M)) - Vol(Hull(C_L)) -
                Vol(Hull(C_R))) /Vol(Hull(C_M))
            If cost < cost_best then
                cost_best := cost
                (C_L^best, C_R^best) := (C_L, C_R)
            end if
        end for
        if cost_best ≤ maxAllowedMergeVolumeIncrease then
            let C_M = MergeClusters(C_L^best, C_R^best)
            Remove C_L^best, C_R^best from S
            Add C_M to S
```

APPENDIX 3-continued

```
        else
            break while
        end if
    end while
end function
```

The invention claimed is:

1. A method, performed by a computing system, of decomposing a three-dimensional representation of an object into a plurality of convex hulls, the method comprising:
   instantiating a cluster priority queue in a memory of the computing system, wherein the cluster priority queue initially contains a cluster corresponding to the three-dimensional representation of the object;
   computing with a processor of the computing system a concavity measure for each cluster in the cluster priority queue;
   for the cluster with the highest concavity measure:
      computing with the processor a cut plane that divides the cluster corresponding to the three-dimensional representation of the object into two new clusters, each of the two new clusters having a corresponding convex hull, wherein computing the cut plane includes performing a hierarchical search of potential cut planes;
      removing the cluster corresponding to the three-dimensional representation of the object from the cluster priority queue; and
      adding the two new clusters to the cluster priority queue;
   computing a collision interaction between the object and another object based on the two new clusters; and
   displaying the collision interaction.

2. The method of claim 1 wherein performing the hierarchical search of the potential cut planes includes a recursive cut plane selection procedure that minimizes concavity of all produced clusters after applying a predetermined number of successive cut planes.

3. The method of claim 1 wherein computing with the processor of the computing system the cut plane further comprises accepting user input to select or modify the cut plane.

4. The method of claim 1 wherein performing the hierarchical search of the potential cut planes further comprises:
   determining a first plurality of cut plane orientations;
   for each of the first plurality of cut plane orientations, computing one or more cost functions associated with the first plurality of cut plane orientations;
   selecting one of the first plurality of cut plane orientations having a lowest cost as determined by the one or more cost functions;
   determining a second plurality of cut plane orientations based on the selected one of the first plurality of cut plane orientations;
   for each of the second plurality of cut plane orientations, computing one or more cost functions associated with the second plurality of cut plane orientations; and
   selecting one of the second plurality of cut plane orientations having a lowest cost as determined by the one or more cost functions associated with the second plurality of cut plane orientations.

5. The method of claim 4 wherein the first and second pluralities of cut plane orientations are selected based on successive subdivisions of a unitary octahedron.

6. The method of claim 4 wherein the one or more cost functions associated with the first plurality of cut plane orientations, the one or more cost functions associated with the second plurality of cut plane orientations, or both include a balance cost function that prefers cut plane orientations that produce approximately equally sized clusters.

7. The method of claim 4 wherein the one or more cost functions associated with the first plurality of cut plane orientations, the one or more cost functions associated with the second plurality of cut plane orientations, or both include a cross-section cost function that prefers cut plane orientations that minimize a cross-sectional area of the intersection of the cut plane and the cluster.

8. The method of claim 4 wherein the one or more cost functions associated with the first plurality of cut plane orientations, the one or more cost functions associated with the second plurality of cut plane orientations, or both include a compactness cost function that prefers cut plane orientations that minimize a sum of surface areas of the two new clusters.

9. The method of claim 1 further comprising:
for each pair of clusters in the cluster priority queue, determining whether the pair of clusters can be merged without increasing concavity above a predetermined threshold; and
if a pair of clusters in the cluster priority queue can be merged without increasing concavity above the predetermined threshold:
merging the pair of clusters to generate a merged cluster;
removing the pair of clusters from the cluster priority queue; and
placing the merged cluster in the cluster priority queue.

10. The method of claim 9 further comprising:
accepting user input with respect to one or more cluster pairs to merge; and
for each cluster pair indicated by the user input to be merged:
merging the cluster pair to generate a user merged cluster;
removing the cluster pair from the cluster priority queue; and
placing the user merged cluster in the cluster priority queue.

11. A method, performed by a computing system, of decomposing a three-dimensional representation of an object into a plurality of convex hulls, the method comprising:
computing with a processor of the computing system a cut plane that divides a cluster stored in a memory of the computing system and corresponding to the three-dimensional representation of the object into two new clusters, each of the two new clusters having a corresponding convex hull, wherein computing the cut plane includes performing a hierarchical search of potential cut planes;
removing the cluster corresponding to the three-dimensional representation of the object from a cluster priority queue; and
adding the two new clusters to the cluster priority queue;
computing an interaction of the object based on the two new clusters; and
displaying the object based on the interaction.

12. The method of claim 11 wherein performing the hierarchical search of the potential cut planes includes a recursive cut plane selection procedure that minimizes concavity of all produced clusters after applying a predetermined number of successive cut planes.

13. The method of claim 11 wherein computing with the processor of the computing system the cut plane further comprises accepting user input to select or modify the cut plane.

14. The method of claim 11 wherein performing the hierarchical search of potential cut planes further comprises:
determining a first plurality of cut plane orientations;
for each of the first plurality of cut plane orientations, computing one or more cost functions associated with the first plurality of cut plane orientations;
selecting one of the first plurality of cut plane orientations having a lowest cost as determined by the one or more cost functions associated with the first plurality of cut plane orientations;
determining a second plurality of cut plane orientations based on the selected one of the first plurality of cut plane orientations;
for each of the second plurality of cut plane orientations, computing one or more cost functions associated with the second plurality of cut plane orientations; and
selecting one of the second plurality of cut plane orientations having a lowest cost as determined by the one or more cost functions associated with the second plurality of cut plane orientations.

15. The method of claim 14 wherein the first and second pluralities of cut plane orientations are selected based on successive subdivisions of a unitary octahedron.

16. The method of claim 14 wherein the one or more cost functions associated with the first plurality of cut plane orientations, the one or more cost functions associated with the second plurality of cut plane orientations, or both include one or more cost functions selected from the group consisting of:
a balance cost function that prefers cut plane orientations that produce approximately equally sized clusters;
a cross-section cost function that prefers cut plane orientations that minimize a cross-sectional area of the intersection of the cut plane and the cluster; and
a compactness cost function that prefers cut plane orientations that minimize a sum of surface areas of the two new clusters.

17. The method of claim 14 wherein performing the hierarchical search of the potential cut planes includes a recursive cut plane selection procedure that minimizes concavity of all produced clusters after applying a predetermined number of successive cut planes.

18. The method of claim 14 further comprising:
for each pair of clusters in a priority queue, determining whether the pair of clusters can be merged without increasing concavity above a predetermined threshold; and
if a pair of clusters in the priority queue can be merged without increasing concavity above the predetermined threshold:
merging the pair of clusters to generate a merged cluster;
removing the pair of clusters from the priority queue; and
placing the merged cluster in the priority queue.

19. The method of claim 18 further comprising:
accepting user input with respect to one or more cluster pairs to merge; and
for each cluster pair indicated by the user input to be merged:
merging the cluster pair of clusters to generate a user merged cluster;
removing the cluster pair from the priority queue; and
placing the user merged cluster in the priority queue.

20. The method of claim 11 wherein the interaction comprises a collision interaction between the object and another object.

21. A method, performed by a computing system, of performing a hierarchical search of potential cut planes for decomposing a three-dimensional representation of an object into a plurality of convex hulls, the method comprising:
determining a first plurality of cut plane orientations;
for each of the first plurality of cut plane orientations, computing one or more cost functions associated with the first plurality of cut plane orientations;
selecting one of the first plurality of cut plane orientations having a lowest cost as determined by the one or more cost functions associated with the first plurality of cut plane orientations;
determining a second plurality of cut plane orientations based on the selected one of the first plurality of cut plane orientations;
for each of the second plurality of cut plane orientations, computing one or more cost functions associated with the second plurality of cut plane orientations;
selecting one of the second plurality of cut plane orientations having a lowest cost as determined by the one or more cost functions;
determining the plurality of convex hulls based on the selected one of the second plurality of cut plane orientations;
determining an interaction of the object based on the plurality of convex hulls; and
displaying the object based on the interaction.

22. The method of claim 21 wherein performing the hierarchical search of the potential cut planes includes a recursive cut plane selection procedure that minimizes concavity of all produced clusters after applying a predetermined number of successive cut planes.

23. The method of claim 21 further comprising:
computing with a processor of the computing system a cut plane based on the selected one of the second plurality of cut plane orientations; and
dividing, based on the cut plane, a cluster stored in a memory of the computing system and corresponding to the three-dimensional representation of the object into two new clusters.

24. The method of claim 21 wherein the first and second pluralities of cut plane orientations are selected based on successive subdivisions of a unitary octahedron.

25. The method of claim 21 wherein the one or more cost functions associated with the first plurality of cut plane orientations, the one or more cost functions associated with the second plurality of cut plane orientations, or both include one or more cost functions selected from the group consisting of:
a balance cost function that prefers cut planes that produce approximately equally sized clusters;
a cross-section cost function that prefers cut plane orientations that minimize a cross-sectional area of the intersection of the cut plane orientations and an input cluster; and
a compactness cost function that prefers cut plane orientations that minimize a sum of surface areas of resulting clusters.

\* \* \* \* \*